(12) United States Patent
Wan et al.

(10) Patent No.: US 12,577,382 B2
(45) Date of Patent: Mar. 17, 2026

(54) THERMOPLASTIC MATERIALS FOR USE IN SLURRY TRANSPORTATION PIPES

(71) Applicant: SABIC GLOBAL TECHNOLOGIES B.V., Bergen op Zoom (NL)

(72) Inventors: Dong Wan, Shanghai (CN); Maria Soliman, Selfkant (DE); Hongtao Shi, Shanghai (CN); Kai Guo, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 694 days.

(21) Appl. No.: 17/915,775

(22) PCT Filed: Mar. 9, 2021

(86) PCT No.: PCT/EP2021/055851
§ 371 (c)(1),
(2) Date: Sep. 29, 2022

(87) PCT Pub. No.: WO2021/197769
PCT Pub. Date: Oct. 7, 2021

(65) Prior Publication Data
US 2023/0203285 A1 Jun. 29, 2023

(30) Foreign Application Priority Data

Mar. 30, 2020 (EP) ..................................... 20166655

(51) Int. Cl.
*C08L 23/0807* (2025.01)
*C08F 210/16* (2006.01)

(52) U.S. Cl.
CPC ........ *C08L 23/0815* (2013.01); *C08F 210/16* (2013.01); *C08L 2203/18* (2013.01); *C08L 2205/025* (2013.01); *C08L 2207/064* (2013.01)

(58) Field of Classification Search
CPC ............. C08L 23/0815; C08L 2203/18; C08L 2205/025; C08L 2207/064; C08L 23/06; C08F 210/16; C08F 210/14; C08F 2500/03; C08F 2500/27; C08F 2500/08; C08F 2500/12; C08F 210/08; C08F 2500/07; C08F 2500/04
See application file for complete search history.

(56) References Cited

U.S. PATENT DOCUMENTS

| | | | |
|---|---|---|---|
| 5,279,872 A | 1/1994 | Ralph | |
| 11,814,505 B2 * | 11/2023 | Xing | ........................ B32B 25/12 |
| 2010/0113720 A1 * | 5/2010 | Ok | ........................... C08F 10/00 |
| | | | 526/170 |
| 2021/0079203 A1 * | 3/2021 | Xing | ........................ B32B 27/30 |

FOREIGN PATENT DOCUMENTS

WO 2019145191 A1 8/2019

OTHER PUBLICATIONS

International Search Report and Written Opinion for the corresponding International Application No. PCT/EP2021/055851; International Filing Date: Mar. 9, 2021; Date of Mailing: May 25, 2021; 13 pages.

* cited by examiner

*Primary Examiner* — Alicia Bland
(74) *Attorney, Agent, or Firm* — CANTOR COLBURN LLP

(57) ABSTRACT

The present invention relates to a thermoplastic material, wherein the thermoplastic material comprises ethylene-based polymer material, wherein the ethylene-based polymer material has a Vicat softening temperature of ≥50° C. as determined in accordance with ISO 306 (2013), method A50, and a weight loss as determined on a compression moulded sheet according to ISO 15527 (2010), Annex B, using silica sand/water slurry with a mass ratio of 3:2, test duration 7 h, of ≤0.50 wt %. The invention also relates to a slurry transportation pipe comprising the thermoplastic material as its inner layer, or consisting of the thermoplastic material.

20 Claims, No Drawings

THERMOPLASTIC MATERIALS FOR USE IN SLURRY TRANSPORTATION PIPES

CROSS-REFERENCE TO RELATED APPLICATIONS

This application is a National Stage application of PCT/EP2021/055851, filed Mar. 9, 2021, which claims benefit of European Application No. 20166655.9 filed on Mar. 30, 2020, both of which are incorporated by reference herein in their entirety.

The present invention relates to a thermoplastic material that may be used in manufacturing transportation pipes that are suitable for transportation of slurries. The invention also relates to a transportation pipe for slurries comprising the thermoplastic material.

For a pipe to be suitable for use in the transportation of slurries, they have to comply with a certain set of specifications to ensure their durable and reliable operability. Transportation pipes are typically used to transport a slurry over a long distance, and may be used in remote locations as well as in populated areas; in each case, one will understand that quality and reliability of such transportation pipes is of paramount importance to avoid leakages, spills, or other disturbances to the transportation process.

Transportation pipes as are subject of the present invention commonly are used for transportation of slurries in very large quantities. An area of application where the pipes may well be employed is in the mining industry, where slurries of for example excavated matter are transported via pipes from the excavation area to an area where the excavated matter is further processed into a form that allows the applicable use of the product obtained from excavation.

Examples of processes wherein such slurries are transported via pipes are coal and lignite processing, iron ore processing, oil and tar sands processing, but also foodstuff processing such as transportation of grain and rice.

Such slurries typically contain a fraction of fairly abrasive materials, which may be organic or inorganic materials. Also, the slurries are transported though the inner of the pipes at particularly high speeds. As a result of that, the interior surface of the pipes is subjected to severe abrasive forces. Accordingly, a pipe that is to be used for this purpose needs to be designed to withstand such forces for the extent of its desired lifetime.

Presently, pipes for such purpose are generally made of steel or ceramics. Such pipes are expensive to produce, they are heavy, and installation and replacement are complicated to perform. In certain situations, pipes of high-density polyethylene (HDPE) are used. However, the longevity of such pipes is rather short, and periodical replacement is required, which detrimentally affects the continuity of the transportation process, not to mention the economics.

Accordingly, one will understand that there is a need for a material from which one may manufacture a pipe for transportation of slurries, which is of particularly light weight, whilst still of such quality that abrasion forces and operating at elevated temperatures can be withstood, and having a desirable longevity.

This is now achieved according to the present invention by a thermoplastic material, wherein the thermoplastic material comprises ethylene-based polymer material, wherein the ethylene-based polymer material has a Vicat softening temperature of ≥50° C. as determined in accordance with ISO 306 (2013), method A50, and a weight loss as determined on a compression moulded sheet according to ISO 15527

(2010), Annex B, using silica sand/water slurry with a mass ratio of 3:2, test duration 7 h, of ≤0.50 wt %.

Such material fulfils the requirements set for use in slurry transportation pipes, in particular allows for required abrasion resistance and high operating temperature at light weight and high durability.

In a particular embodiment, the ethylene-based polymer material has a density of ≥0.875 and ≤0.900 g/cm³, as determined in accordance with ISO 1183-1 (2019). Even more particularly, the ethylene-based polymer may have a density of ≥0.880 and ≤0.890 g/cm³.

In certain embodiments, the ethylene-based polymer material may for example be an ethylene-1-octene copolymer having:

a density of ≥0.880 and ≤0.890 g/cm³, as determined in accordance with ISO 1183-1 (2019);

a fraction of moieties derived from 1-octene of ≥20.0 and ≤40.0 wt %, preferably of ≥20.0 and ≤30.0 wt %, with regard to the total weight of the ethylene-1-octene copolymer; and/or a molecular weight distribution $M_w/M_n$ of ≥1.5 and ≤2.5, wherein the weight-average molecular weight $M_w$ and the number average molecular weight $M_n$ are determined in accordance with ASTM D6474 (2012).

Particular embodiments of the invention also encompass the thermoplastic material to comprise ethylene-based polymer material comprising a fraction (A) of a first ethylene-based polymer (P1) and a fraction (B) of a second ethylene based polymer (P2); wherein:

the first ethylene-based polymer P1 has a density of <0.880 g/cm³, preferably of >0.850 and <0.880 g/cm³, as determined in accordance with ISO 1183-1 (2019); and the second ethylene-based polymer P2 has a density of >0.890 g/cm³, preferably of >0.890 and <0.930 g/cm³, as determined in accordance with ISO 1183-1 (2019);

wherein the ethylene-based polymer comprises >10.0 wt % and <90.0 wt % of P1, with regard to the sum of the weight of P1 and P2.

The thermoplastic material may for example comprise ≥90.0 wt % of the ethylene-based materials, preferably ≥95.0 wt %, more preferably ≥98.0 wt %, with regard to the total weight of the thermoplastic material. In a further preferred embodiment, the thermoplastic material consists of the ethylene-based polymer material.

For example, P1 and P2 may both be ethylene-1-octene copolymers. P1 may for example comprise ≥30.0 and ≤45.0 wt % of moieties derived from 1-octene, with regard to the total weight of P1, preferably ≥30.0 and ≤40.0 wt %, more preferably ≥35.0 and ≤40.0 wt %. P2 may for example comprise ≥0.5 and ≤10.0 wt % of moieties derived from 1-octene, with regard to the total weight of P2, preferably ≥5.0 and ≤10.0 wt %. For example, P1 may comprise ≥30.0 and ≤45.0 wt % of moieties derived from 1-octene, and P2 may for example comprise ≥0.5 and ≤10.0 wt % of moieties derived from 1-octene. Preferably, P1 may comprise ≥35.0 and ≤40.0 wt % of moieties derived from 1-octene, and P2 may comprise ≥5.0 and ≤10.0 wt % of moieties derived from 1-octene.

P1 may for example have a melt mass-flow rate as determined in accordance with ISO 1133-1 (2011) at 190° C. and under a load of 2.16 kg (MFR2) of ≥0.10 and ≤2.00 g/10 min, preferably of ≥0.10 and ≤0.80 g/10 min. P2 may for example have an MFR2 of ≥0.50 g/10 min, preferably of ≥0.85 and ≤2.00 g/10 min. Preferably, P1 has a melt mass-flow rate as determined in accordance with ISO 1133-1 (2011) at 190° C. and under a load of 2.16 kg (MFR2) of ≥0.10 and ≤2.00 g/10 min, preferably of ≥0.10 and ≤0.80 g/10 min, and P2 has an MFR2 of ≥0.50 g/10 min, preferably of ≥0.85 and ≤2.00 g/10 min. For example, P1 may have an MFR2 that is at least 0.20 g/min, preferably at least 0.40 g/10 min, lower than the MFR2 of P2.

In a particular embodiment of the invention, P1 has a molecular weight distribution $M_w/M_n$ of ≥2.0 and ≤2.5, and/or P2 has a molecular weight distribution $M_w/M_n$ of ≥2.0 and ≤2.5.

A further particular embodiment of the invention relates to a thermoplastic material, wherein the thermoplastic material comprises ethylene-based polymer material, wherein the ethylene-based polymer material has a Vicat softening temperature of ≥50° C. as determined in accordance with ISO 306 (2013), method A50, and a weight loss as determined on a compression moulded sheet according to ISO 15527 (2010), Annex B, using silica sand/water slurry with a mass ratio of 3:2, test duration 7 h, of ≤0.50 wt %, wherein the ethylene-based material is an ethylene-1-octene copolymer having:

a density of ≥0.880 and ≤0.890 g/cm³, as determined in accordance with ISO 1183-1 (2019);

a fraction of moieties derived from 1-octene of ≥20.0 and ≤30.0 wt % with regard to the total weight of the ethylene-1-octene copolymer; and/or a molecular weight distribution $M_w/M_n$ of ≥1.5 and ≤2.5, wherein the weight-average molecular weight $M_w$ and the number average molecular weight $M_n$ are determined in accordance with ASTM D6474 (2012).

In a yet further particular embodiment of the invention, the thermoplastic material consists of ethylene-based polymer material, wherein the ethylene-based polymer material has a Vicat softening temperature of ≥50° C. as determined in accordance with ISO 306 (2013), method A50, and a weight loss as determined on a compression moulded sheet according to ISO 15527 (2010), Annex B, using silica sand/water slurry with a mass ratio of 3:2, test duration 7 h, of ≤0.50 wt %, wherein the ethylene-based material is an ethylene-1-octene copolymer having:

a density of ≥0.880 and ≤0.890 g/cm³, as determined in accordance with ISO 1183-1 (2019);

a fraction of moieties derived from 1-octene of ≥20.0 and ≤30.0 wt % with regard to the total weight of the ethylene-1-octene copolymer; and/or a molecular weight distribution $M_w/M_n$ of ≥1.5 and ≤2.5, wherein the weight-average molecular weight $M_w$ and the number average molecular weight $M_n$ are determined in accordance with ASTM D6474 (2012).

Another embodiment of the invention also relates to a thermoplastic material, wherein the thermoplastic material comprises or consists of ethylene-based polymer material, wherein the ethylene-based polymer material has a Vicat softening temperature of ≥50° C. as determined in accordance with ISO 306 (2013), method A50, and a weight loss as determined on a compression moulded sheet according to ISO 15527 (2010), Annex B, using silica sand/water slurry with a mass ratio of 3:2, test duration 7 h, of ≤0.50 wt %, wherein the ethylene-based polymer material comprises a fraction (A) of a first ethylene-based polymer (P1) and a fraction (B) of a second ethylene based polymer (P2); wherein:

the first ethylene-based polymer P1 has a density of <0.880, preferably <0.870 g/cm³, preferably of >0.850 and <0.880 g/cm³, more preferably of >0.850 and <0.870 g/cm³, as determined in accordance with ISO 1183-1 (2019); and the second ethylene-based polymer P2 has a density of >0.890, preferably >0.900 g/cm³, preferably of >0.890 and <0.930 g/cm³, more preferably >0.900 and <0.930 g/cm³, as determined in accordance with ISO 1183-1 (2019);

wherein the ethylene-based polymer comprises >10.0 wt % and <90.0 wt % of P1, with regard to the sum of the weight of P1 and P2.

In certain of its embodiments, the present invention also relates to a pipe comprising the thermoplastic material, or consisting of the thermoplastic material. Such pipe may have an inner layer of the thermoplastic material.

In a particular embodiment, the invention relates to a pipe comprising the thermoplastic material, wherein the thermoplastic material consists of ethylene-based polymer material, wherein the ethylene-based polymer material has a Vicat softening temperature of ≥50° C. as determined in accordance with ISO 306 (2013), method A50, and a weight loss as determined on a compression moulded sheet according to ISO 15527 (2010), Annex B, using silica sand/water slurry with a mass ratio of 3:2, test duration 7 h, of ≤0.50 wt %, wherein the ethylene-based material is an ethylene-1-octene copolymer having:

a density of ≥0.880 and ≤0.890 g/cm³, as determined in accordance with ISO 1183-1 (2019);

a fraction of moieties derived from 1-octene of ≥20.0 and ≤30.0 wt % with regard to the total weight of the ethylene-1-octene copolymer; and/or a molecular weight distribution $M_w/M_n$ of 1.5 and ≤2.5, wherein the weight-average molecular weight $M_w$ and the number average molecular weight $M_n$ are determined in accordance with ASTM D6474 (2012).

In another embodiment, the invention relates to a pipe comprising the thermoplastic material, wherein the thermoplastic material consists of ethylene-based polymer material, wherein the ethylene-based polymer material has a Vicat softening temperature of ≥50° C. as determined in accordance with ISO 306 (2013), method A50, and a weight loss as determined on a compression moulded sheet according to ISO 15527 (2010), Annex B, using silica sand/water slurry with a mass ratio of 3:2, test duration 7 h, of ≤0.50 wt %, wherein the ethylene-based polymer material comprises a fraction (A) of a first ethylene-based polymer (P1) and a fraction (B) of a second ethylene based polymer (P2); wherein:

the first ethylene-based polymer P1 has a density of <0.870 g/cm³, preferably of >0.850 and <0.870 g/cm³, as determined in accordance with ISO 1183-1 (2019); and the second ethylene-based polymer P2 has a density of >0.900 g/cm³, preferably of >0.900 and <0.930 g/cm³, as determined in accordance with ISO 1183-1 (2019);

wherein the ethylene-based polymer comprises >10.0 wt % and <90.0 wt % of P1, with regard to the sum of the weight of P1 and P2.

For example, the pipe of the invention may comprise an inner layer comprising or consisting of the thermoplastic material. The inner layer may for example have a thickness of >0.05 and <10.0 cm, preferably >0.1 and <2.0 cm. The pipe may for example consist of a single layer of material. The pipe may for example have an inner diameter of >0.02 and <2.00 m, preferably >0.05 and <1.00 m.

The invention further also relates to a process for the production of the thermoplastic material, wherein the process involves polymerisation of reactants in two or at least two reactors positioned in series, wherein the first ethylene-based polymer P1 is produced by polymerisation of a first reactant mixture in the first reactor, followed by production of the second ethylene-based polymer P2 by polymerisation of a second reactant mixture in the second reactor, wherein the second reactant mixture comprises the first ethylene-based polymer P1.

Alternatively, the invention relates to a process for the production of the thermoplastic material wherein the process involves combining a quantity of the first ethylene-based polymer P1 and a quantity of the second ethylene-based polymer P2 by means of blending under melt conditions or in the solid phase.

The invention will now be illustrated by the following non-limiting examples.

Materials Used

| C0560D | SABIC FORTIFY C0560D, an ethylene-octene copolymer obtainable from SABIC, having an $M_w$ of 145.2 kg/mol, an $M_n$ of 67.7 g/mol, an $M_w/M_n$ of 2.14, a comonomer content of 39 wt % of units derived from 1-octene, a density of 0.864 g/cm³ and an MFR2 of 0.50 g/10 min. |
| C0570D | SABIC FORTIFY C0570D, an ethylene-octene copolymer obtainable from SABIC, having an $M_w$ of 134.8 kg/mol, an $M_n$ of 62.1 g/mol, an $M_w/M_n$ of 2.17, a comonomer content of 36 wt % of units derived from 1-octene, a density of 0.868 g · cm³ and an MFR2 of 0.50 g/10 min. |
| C1070D | SABIC FORTIFY C1070D, an ethylene-octene copolymer obtainable from SABIC, having an $M_w$ of 121.4 kg/mol, an $M_n$ of 57.6 g/mol, an $M_w/M_n$ of 2.11, a comonomer content of 36 wt % of units derived from 1-octene, a density of 0.870 g/cm³ and an MFR2 of 1.00 g/10 min. |
| C1080D | SABIC FORTIFY C1080D, an ethylene-octene copolymer obtainable from SABIC, having an $M_w$ of 116.9 kg/mol, an $M_n$ of 54.0 g/mol, an $M_w/M_n$ of 2.16, a comonomer content of 28 wt % of units derived from 1-octene, a density of 0.881 g/cm³ and an MFR2 of 0.96 g/10 min. |
| C1085 | SABIC FORTIFY C1085, an ethylene-octene copolymer obtainable from SABIC, having an $M_w$ of 110.0 kg/mol, an $M_n$ of 54.9 g/mol, an $M_w/M_n$ of 2.00, a comonomer content of 26 wt % of units derived from 1-octene, a density of 0.887 g/cm³ and an MFR2 of 0.98 g/10 min. |
| 8102 | SABIC COHERE 8102, an ethylene-octene copolymer obtainable from SABIC, having an $M_w$ of 105.0 kg/mol, an $M_n$ of 38.0 g/mol, an $M_w/M_n$ of 2.76, a comonomer content of 18 wt % of units derived from 1-octene, a density of 0.898 g/cm³ and an MFR2 of 0.94 g/10 min. |
| 8112 | SABIC SUPEER 8112, an ethylene-octene copolymer obtainable from SABIC having an $M_w$ of 104.0 kg/mol, an $M_n$ of 38.0 g/mol, an $M_w/M_n$ of 2.73, a comonomer content of 10 wt % of units derived from 1-octene, a density of 0.912 g/cm³ and an MFR2 of 1.16 g/10 min. |
| 118N | SABIC LLDPE 118N, an ethylene-butene copolymer obtainable from SABIC having an $M_w$ of 125.0 kg/mol, an $M_n$ of 30.6 g/mol, an $M_w/M_n$ of 4.08, a comonomer content of 7 wt % of units derived from 1-butene, a density of 0.918 g/cm³ and an MFR2 of 0.95 g/10 min. |
| B5403 | SABIC HDPE B5403, a high-density polyethylene obtainable from SABIC having an $M_w$ of 380.0 kg/mol, an $M_n$ of 21.0 g/mol, an $M_w/M_n$ of 18.10, a comonomer content of 0.3 wt % of units derived from 1-butene, a density of 0.954 g/cm³ and an MFR5 of 0.14 g/10 min. |

MFR2 is the melt mass-flow rate as determined in accordance with ISO 1133 (2011) at 190° C. under a load of 2.16 kg; likewise, MFR5 is the melt-mass flow rate determined at 190° C. under a load of 5.0 kg. The density is determined in accordance with ISO 1183-1 (2012).

Using the above materials, polymer formulations were prepared by melt-mixing the materials in a twin-screw melt extruder of type ZSK26Mc, connected with an underwater pelletizing system to form solidified pellets of the polymer formulation. The extruder conditions were as listed below:

| Zone temperatures (° C.) | | | | | | | | | |
|---|---|---|---|---|---|---|---|---|---|
| Zone 1 | 2 | 3 | 4 | 5 | 6 | 7 | 8 | 9 | Die |
| 80 | 120 | 160 | 160 | 160 | 160 | 160 | 160 | 160 | 160 |

| Die gap | Screw speed | Throughput |
|---|---|---|
| 3 mm | 300 rpm | 15 kg/h |

Via this melt mixing, exemplary formulations were produced according to the compositions of materials as set out in the table below:

| Ex. | Composition |
|---|---|
| 1 | 40.0 wt % C0560D, 60.0 wt % 8112 |
| 2 | 45.0 wt % C0560D, 55.0 wt % 8112 |
| 3 | 50.0 wt % C0560D, 50.0 wt % 8112 |
| 4 | 55.0 wt % C0560D, 45.0 wt % 8112 |
| 5 | 60.0 wt % C0560D, 40.0 wt % 8112 |
| 6 | 70.0 wt % C0560D, 30.0 wt % 8112 |
| 7 | 90.0 wt % C0560D, 10.0 wt % 118N |
| 8 | 80.0 wt % C0560D, 20.0 wt % 118N |
| 9 | 70.0 wt % C0560D, 30.0 wt % 118N |
| 10 | 60.0 wt % C0560D, 40.0 wt % 118N |
| 11 | 90.0 wt % C0560D, 10.0 wt % B5403 |
| 12 | 80.0 wt % C0560D, 20.0 wt % B5403 |
| 13 | 70.0 wt % C0560D, 30.0 wt % B5403 |
| 14 | 60.0 wt % C0560D, 40.0 wt % B5403 |
| 15 | 45.0 wt % C0570D, 55.0 wt % 8102 |
| 16 | 45.0 wt % C1085, 55.0 wt % 8102 |
| 17 | 45.0 wt % C1085, 55.0 wt % 8112 |
| 18 | 100% C1070D |
| 19 | 100% C1080D |
| 20 | 100% C1085 |
| 21 | 100% 8102 |
| 22 | 100% 8112 |
| 23 | 100% B5403 |

For each of the formulations, material properties were determined as indicated in the table below:

| Ex. | MFR2 | Density | Vicat | Hardness | Weight loss | Tensile modulus |
|---|---|---|---|---|---|---|
| 1 | 0.81 | 0.896 | 64.2 | 91.6 | 0.521 | 47.4 |
| 2 | 0.74 | 0.893 | 58.4 | 90.0 | 0.445 | 41.7 |
| 3 | 0.70 | 0.892 | 53.6 | 88.7 | 0.331 | 33.1 |
| 4 | 0.70 | 0.888 | 49.2 | 86.7 | 0.275 | 22.8 |
| 5 | 0.68 | 0.885 | 45.5 | 84.3 | 0.250 | 23.9 |
| 6 | 0.63 | 0.879 | 41.7 | 79.9 | 0.192 | 15.9 |
| 7 | 0.53 | 0.872 | 39.0 | 70.3 | 0.110 | 5.8 |
| 8 | 0.56 | 0.878 | 42.0 | 75.2 | 0.090 | 8.8 |
| 9 | 0.57 | 0.883 | 47.0 | 80.1 | 0.140 | 13.3 |
| 10 | 0.59 | 0.888 | 51.0 | 84.8 | 0.260 | 27.1 |
| 11 | 0.37 | 0.875 | 37.7 | 71.2 | 0.090 | 10.3 |
| 12 | 0.28 | 0.882 | 40.4 | 79.7 | 0.160 | 15.9 |
| 13 | 0.20 | 0.889 | 46.2 | 87.2 | 0.190 | 35.0 |
| 14 | 0.15 | 0.897 | 55.1 | 92.8 | 0.400 | 91.0 |
| 15 | 0.73 | 0.884 | 58.4 | 87.7 | 0.358 | 30.3 |
| 16 | 1.00 | 0.894 | 72.9 | 91.3 | 0.617 | 44.6 |
| 17 | 1.05 | 0.902 | 80.9 | 93.8 | 0.844 | 73.4 |
| 18 | 1.00 | 0.870 | 37.5 | 70.7 | 0.155 | 5.4 |
| 19 | 0.96 | 0.881 | 49.8 | 83.5 | 0.310 | 15.7 |
| 20 | 0.98 | 0.887 | 59.6 | 87.9 | 0.421 | 25.5 |
| 21 | 0.94 | 0.898 | 83.6 | 93.5 | 0.769 | 64.5 |

7

-continued

| Ex. | MFR2 | Density | Vicat | Hardness | Weight loss | Tensile modulus |
|-----|------|---------|-------|----------|-------------|-----------------|
| 22 | 1.16 | 0.912 | 98.7 | 95.7 | 1.549 | 126.9 |
| 23 | 0.14* | 0.954 | 131.2 | 96.6 | 2.715 | 1187.4 |

*for example 23, the MFR5 was determined

Wherein:

The MFR2 and the MFR5 are determined as indicated above, and expressed in g/10 min;

The density is determined as indicated above, and expressed in g/cm³;

Vicat is the Vicat softening temperature as determined in accordance with ISO 306 (2013), at a heating rate of 50° C./h, and under a load of 10 N;

Hardness is the Shore A hardness as determined in accordance with ISO 868 (dimensionless);

Weight loss is determined on a compression moulded sheet according to ISO 15527 (2010), Annex B, using silica sand/water slurry with a mass ratio of 3:2, test duration 7 h, expressed in wt %;

Tensile modulus is determined in accordance with ISO 527, expressed in MPa.

The invention claimed is:

1. A thermoplastic material, wherein the thermoplastic material comprises an ethylene-based polymer material, wherein the ethylene-based polymer material has a Vicat softening temperature of ≥50° C. as determined in accordance with ISO 306 (2013), method A50, and a weight loss as determined on a compression moulded sheet according to ISO 15527 (2010), Annex B, using silica sand/water slurry with a mass ratio of 3:2, test duration 7 h, of ≤0.50 wt %;

wherein the ethylene-based polymer material comprises a first ethylene-based polymer (P1) and a second ethylene-based polymer (P2);

wherein:

the first ethylene-based polymer P1 has a density of <0.880 g/cm3, as determined in accordance with ISO 1183-1 (2019); and the second ethylene-based polymer P2 has a density of >0.890 g/cm3, as determined in accordance with ISO 1183-1 (2019); and wherein the ethylene-based polymer material comprises >10.0 wt % and <90.0 wt % of P1, with regard to the sum of the weight of P1 and P2; and wherein P1 and P2 are both ethylene-1-octene copolymers.

2. The thermoplastic material according to claim 1, wherein the thermoplastic material comprises ≥90.0 wt % of the ethylene-based polymer material.

3. The thermoplastic material according to claim 1, wherein the ethylene-based polymer material has a density of ≥0.875 and ≤0.900 g/cm³, as determined in accordance with ISO 1183-1 (2019).

4. The thermoplastic material according to claim 1, wherein the ethylene-based polymer material has:

a density of ≥0.880 and ≤0.890 g/cm³, as determined in accordance with ISO 1183-1 (2019); and a fraction of moieties derived from 1-octene of ≥20.0 and ≤30.0 wt % with regard to the total weight of the ethylene-1-octene copolymer.

5. The thermoplastic material according to claim 1, wherein:

the first ethylene-based polymer P1 has a density of >0.850 and <0.880 g/cm³, as determined in accordance with ISO 1183-1 (2019); and the second ethylene-based polymer P2 has a density of >0.890 g/cm³ and <0.930 g/cm³, as determined in accordance with ISO 1183-1 (2019).

6. The thermoplastic material according to claim 5, wherein the thermoplastic material comprises ≥90.0 wt % of the ethylene-based material.

7. Thermoplastic material according to claim 1, wherein:

P1 has a melt mass-flow rate as determined in accordance with ISO 1133-1 (2011) at 190° C. and under a load of 2.16 kg (MFR2) of ≥0.10 and ≤2.00 g/10 min;

P2 has an MFR2 of ≥0.50 g/10 min; and/or

P1 has an MFR2 that is at least 0.20 g/min.

8. The thermoplastic material according to claim 1, wherein P1 has a molecular weight distribution $M_w/M_n$ of ≥2.0 and ≤2.5, and/or P2 has a molecular weight distribution $M_w/M_n$ of ≥2.0 and ≤2.5.

9. The thermoplastic material according to claim 1, wherein P1 comprises ≥30.0 and ≤45.0 wt % of moieties derived from 1-octene.

10. The thermoplastic material according to claim 1, wherein P2 comprises ≥0.5 and ≤10.0 wt % of moieties derived from 1-octene.

11. The thermoplastic material according to claim 1, wherein the first ethylene-based polymer (P1) comprises ≥35.0 and ≤40.0 wt % of moieties derived from 1-octene with regard to the total weight of P1; and the second ethylene based polymer (P2) comprises ≥0.5 and ≤10.0 wt % of moieties derived from 1-octene with regard to the total weight of P2.

12. The thermoplastic material according to claim 1, wherein the ethylene-based polymer material comprises ≥20.0 and ≤30.0 wt % of moieties derived from 1-octene with regard to the sum of the weight of P1 and P2.

13. The thermoplastic material according to claim 1, wherein:

the first ethylene-based polymer P1 has a density >0.850 and <0.870 g/cm³, as determined in accordance with ISO 1183-1 (2019); and the second ethylene-based polymer P2 has a density of >0.900 and <0.930 g/cm³, as determined in accordance with ISO 1183-1 (2019).

14. The thermoplastic material according to claim 1, wherein:

the first ethylene-based polymer (P1)

comprises ≥35.0 and ≤40.0 wt %, of moieties derived from 1-octene with regard to the total weight of P1, has a density >0.850 and <0.870 g/cm³, as determined in accordance with ISO 1183-1 (2019), and has a melt mass-flow rate as determined in accordance with ISO 1133-1 (2011) at 190° C. and under a load of 2.16 kg (MFR2) of ≥0.10 and ≤0.80 g/10 min;

the second ethylene based polymer (P2)

comprises ≥0.5 and ≤10.0 wt % of moieties derived from 1-octene with regard to the total weight of P2, has a density of >0.900 and <0.930 g/cm³, as determined in accordance with ISO 1183-1 (2019), and has a melt mass-flow rate as determined in accordance with ISO 1133-1 (2011) at 190° C. and under a load of 2.16 kg (MFR2) of ≥0.85 and ≤2.00 g/10 min; and the ethylene-based polymer material comprises ≥20.0 and ≤30.0 wt % of moieties derived from 1-octene with regard to the sum of the weight of P1 and P2.

15. A pipe comprising an inner layer comprising the thermoplastic material according to claim 1.

16. The pipe according to claim 15, wherein the pipe consists of a single layer of the thermoplastic material.

17. The pipe according to claim 15, wherein the pipe has an inner diameter of >0.10 and <1.00 m.

18. Pipe according to claim 15, wherein the inner layer has a thickness of >0.1 and <10.0 cm.

19. A process for the production of the thermoplastic material according to claim 5, wherein the process comprises polymerisation of reactants in at least two reactors positioned in series, wherein the first ethylene-based polymer P1 is produced by polymerisation of a first reactant mixture in the first reactor, followed by production of the second ethylene-based polymer P2 by polymerisation of a second reactant mixture in the second reactor, wherein the second reactant mixture comprises the first ethylene-based polymer P1.

20. The process for the production of the thermoplastic material according to claim 5, wherein the process comprises combining a quantity of the first ethylene-based polymer P1 and a quantity of the second ethylene-based polymer P2 by means of blending under melt conditions or in a solid phase.

* * * * *